United States Patent [19]

Kim

[11] Patent Number: 5,754,703

[45] Date of Patent: May 19, 1998

[54] METHOD FOR ENCODING A CONTOUR OF AN OBJECT IN A VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 767,466

[22] Filed: Dec. 16, 1996

[51] Int. Cl.$^6$ .................... G06K 9/36; G06F 19/00
[52] U.S. Cl. .................... 382/241; 382/199; 382/242; 364/474.29; 364/474.37
[58] Field of Search .................... 382/199, 200, 382/241, 242; 364/474.29, 474.37; 345/423, 442

[56] References Cited

U.S. PATENT DOCUMENTS

| | | | |
|---|---|---|---|
| 4,748,675 | 5/1988 | Suzuki et al. | 382/241 |
| 5,115,479 | 5/1992 | Murayama | 382/242 |
| 5,233,671 | 8/1993 | Murayama | 382/241 |
| 5,568,567 | 10/1996 | Yokoyama | 382/241 |
| 5,675,669 | 10/1997 | Kim | 382/242 |
| 5,691,769 | 11/1997 | Kim | 382/241 |

FOREIGN PATENT DOCUMENTS

| | | |
|---|---|---|
| 0734163 | 9/1996 | European Pat. Off. . |
| 2114851 | 8/1983 | United Kingdom . |
| 2160382 | 12/1985 | United Kingdom . |

Primary Examiner—Edward L. Coles, Sr.
Assistant Examiner—Mark Wallerson
Attorney, Agent, or Firm—Anderson Kill & Olick, P.C.

[57] ABSTRACT

A set of first errors selected from sets of errors indexed as, e.g., sets of first to Kth errors between contour segments and corresponding line segments at a predetermined number of sample points on each of line segments, K being a positive integer, fitted to a contour of an object in a video signal by using a polygonal approximation method is encoded and decoded after being transformed and quantized to thereby generate an encoded set of first errors and a decoded set of first errors. Thereafter, the process described hereinafter is repeated for all the remaining sets of errors, from a set of second errors to a set of Kth errors, to thereby generate all the remaining encoded and decoded sets of errors. If a sum of each absolute value of errors in a set of ith errors is not greater than that in a set of ith subtracted errors obtained by subtracting a set of (i-1)st decoded errors from the set of ith errors, the set of ith errors is encoded and decoded after being transformed and quantized to thereby generate an encoded set of ith errors and a decoded set of ith errors. But if otherwise, the set of ith subtracted errors is encoded and decoded after being transformed and quantized to thereby generate an encoded set of ith errors and a decoded set of ith errors, wherein i is a positive integer ranging from 2 to K.

16 Claims, 2 Drawing Sheets

METHOD FOR ENCODING A CONTOUR OF AN OBJECT IN A VIDEO SIGNAL

FIELD OF THE INVENTION

The present invention relates to a method for encoding a video signal; and, more particularly, to a method capable of effectively encoding a contour of an object in a video signal, thereby reducing the amount of data to be transmitted.

DESCRIPTION OF THE PRIOR ART

In a digitally televised system such as video-telephone, teleconference or high definition television system, a large amount of digital data is needed to define each video frame signal since a video line signal in the video frame signal includes a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference system.

One of such techniques for encoding video signals for a low bit-rate encoding system is an object-oriented analysis-synthesis coding technique, wherein an input video image is divided into objects, and three sets of parameters for defining the motion, the contour and the pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error and results in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

In an apparatus which adopts the contour approximation technique based on the polygonal approximation and the DST, as disclosed in a commonly owned copending application, U.S. Pat. application Ser. No. 08/423,604, entitled "A CONTOUR APPROXIMATION APPARATUS FOR REPRESENTING A CONTOUR OF AN OBJECT", a number of vertex points on the contour are determined and the contour of an object is approximated through the use of polygonal approximation for fitting the contour by line segments connecting the adjacent vertices. And, N sample points on each line segment are selected and an approximation error at each of the N sample points located on each line segment is sequentially calculated in order to obtain a set of approximation errors for each line segment. The N sample points are equi-distanced on each line segment and an approximation error at a sample point on the line segment represents a displacement from the sample point to the corresponding contour segment along a line vertical to the line segment. Thereafter, sets of DST coefficients are generated by performing a one-dimensional DST operation on each set of approximation errors.

Even though it is possible to remedy the rough representation and computational complexity and reduce the volume of transmission data through the use of the DST-based contour approximation, it still remains desirable to further reduce the volume of transmission data in order to efficiently implement a low-bit rate codec system having, e.g., a 64 kb/s transmission channel bandwidth.

SUMMARY OF THE INVENTION

It is, therefore, a primary object of the invention to provide a method for encoding a contour of an object in a video signal, which is capable of further reducing the amount of transmission data by using a correlation between adjacent contour segments based on outputs of a polygonal approximation process.

In accordance with the present invention, there is provided a method for encoding a contour of an object in a video signal based on a polygonal approximation thereof, wherein the contour is divided into a plurality of contour segments including a reference contour segment and each contour segment approximated by a line segment joining two end points thereof, the method comprising the steps of: (a) estimating a set of first approximation errors representing a difference between the reference contour segment and a first line segment, the first line segment joining two end points of the reference contour segment; (b) obtaining a set of second approximation errors representing a difference between one of remaining contour segments and a second line segment, the second line segment being defined as a line segment joining two end points of said one of the remaining contour segments; (c) calculating a set of differential errors by subtracting the set of first approximation errors from the set of second approximation errors; (d) finding a first error value for the set of differential errors, the first error value being obtained based on a magnitude of said each differential error; (e) computing a second error value for the set of second approximation errors, the second error value being obtained based on a magnitude of said each second approximation error; (f) selecting, as a set of errors for said one of the remaining contour segments, either the set of differential errors or the set of second approximation errors based on the first and the second error values; and (g) encoding the set of errors to thereby provide an encoded set of errors.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
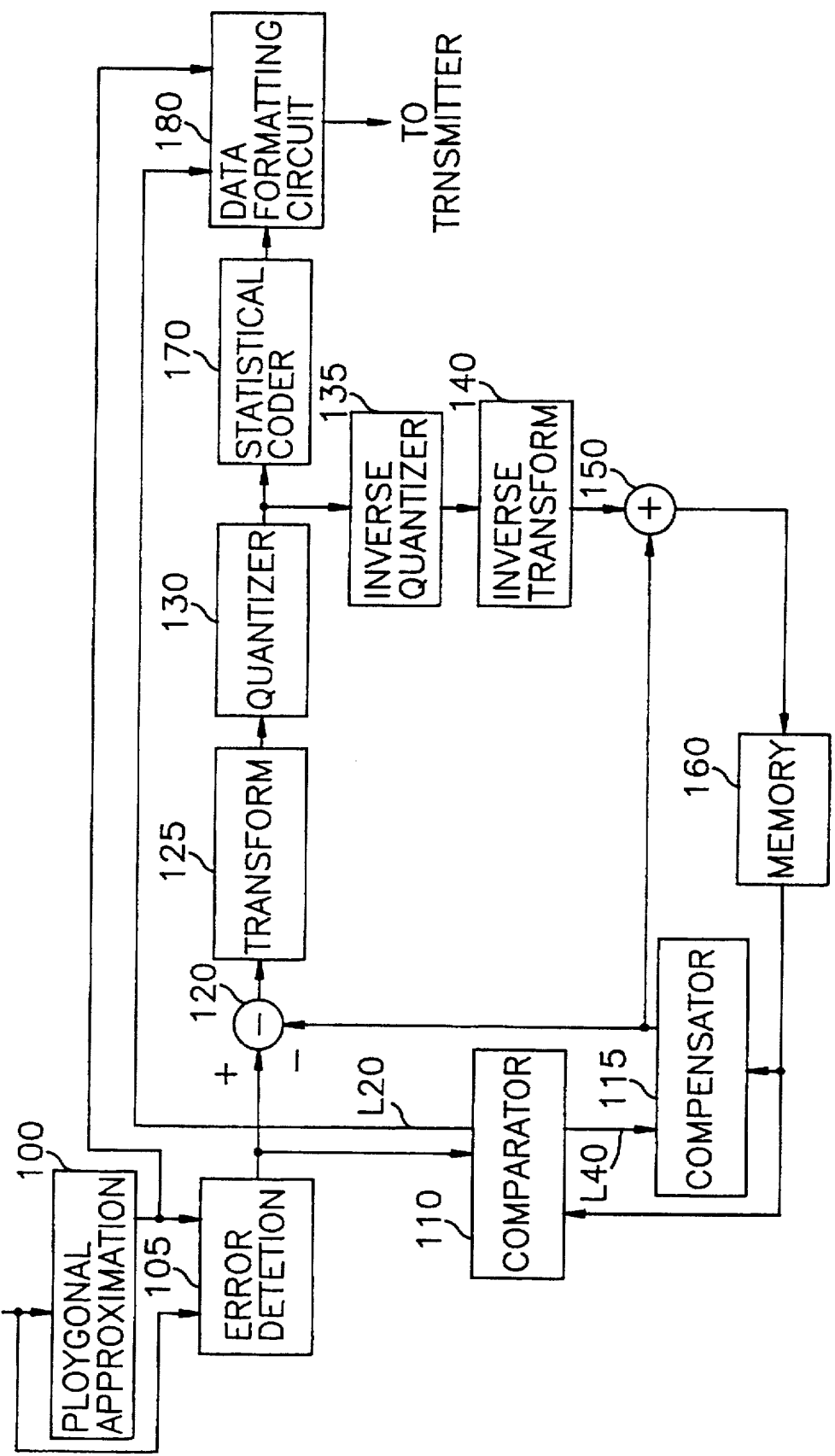
FIG. 1 depicts a block diagram representing a method for encoding a contour of an object in a video signal in accordance with the present invention.

Referring to FIG. 1, there is shown a block diagram representing a method for encoding a contour of an object in a video signal in accordance with the present invention.

Contour image data of the object in the video signal is inputted to a polygonal approximation block 100 and an error detection block 105.

At the polygonal approximation block 100, a polygonal approximation to the contour of the object inputted thereto is carried out through the use of a conventional polygonal approximation algorithm for fitting the contour with line segments. As a result of the polygonal approximation, a number of vertices on the contour are determined and the contour of the object is approximated by fitting the contour with a plurality of line segments connecting adjacent vertices. At the polygonal approximation block 100, the vertices are indexed. First, one of the vertices is selected as an initial vertex; and one of neighboring vertices of the initial vertex is determined as a next vertex. Thereafter, the process of choosing an unselected vertex adjacent to the last selected vertex as a next vertex is repeated until all the vertices are indexed. Vertex information representing the positions of the vertices on the contour is then provided to the error detection block 105 and a data formatting circuit 180.

The error detection block 105 selects N sample points on each line segment and calculates an error or an approximation error at each sample point on each line segment based on the vertex information and the contour image data. In a preferred embodiment of the invention, the N sample points are equidistanced on each line segment with N being a positive integer, e.g., 8. An error or an approximation error at a sample point on the line segment represents a displacement from the sample point to an intersection point on the corresponding contour segment, the intersection point being formed by the corresponding contour segment and a line vertical to the line segment, wherein the displacement is represented by a distance between the sample point and the intersection point and a sign denoting the relative position of the intersection point with respect to the line segment.

Figure 2:
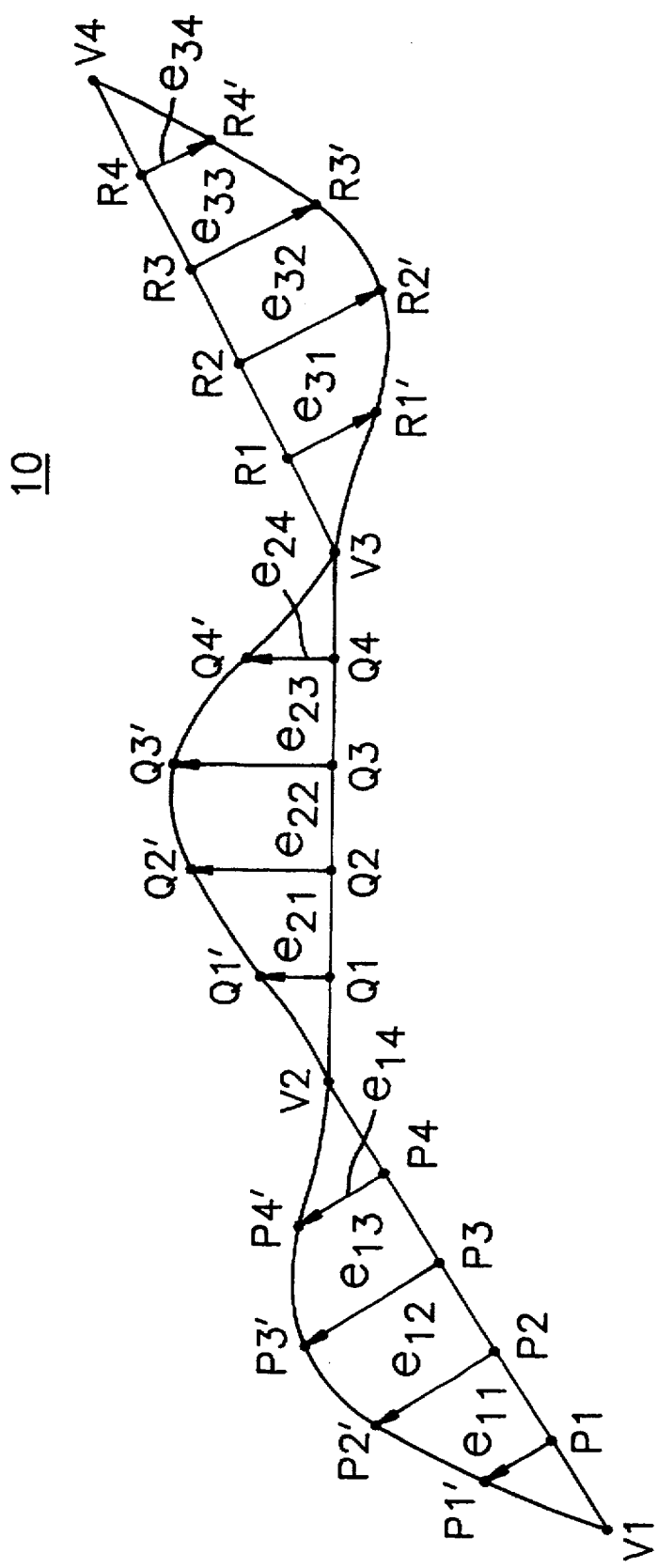
FIG. 2 illustrates an exemplary diagram representing errors between each line segment joining two adjacent vertices and its corresponding contour segment.

Referring to FIG. 2, a sign determination scheme is described, wherein a portion of the contour 10 having, e.g., 4 vertices $V_1$ to $V_4$ thereon is illustrated and for the sake of simplicity, it is assumed that N is 4. P1 to P4, Q1 to Q4 and R1 to R4 represent sample points determined on line segments $\overline{V_1V_2}$, $\overline{V_2V_3}$ and $\overline{V_3V_4}$, respectively and P1' to P4', Q1' to Q4' and R1' to R4' are intersection points determined on corresponding contour segments, respectively. In a preferred embodiment of the invention, a positive sign is assigned to an intersection point if the intersection point resides on the left hand side of a vector drawn from $V_i$ to $V_{i+1}$ and a negative sign, if otherwise. In a manner described above, the positive sign is assigned to errors $e_{11}$ to $e_{14}$ for the line segment $\overline{V_1V_2}$ and $e_{21}$ to $e_{24}$ for the line segment $\overline{V_2V_3}$; and the negative sign is assigned to errors $e_{31}$ to $e_{34}$ for the line segment $\overline{V_3V_4}$.

After determining errors for each of the line segments, the error detection block 105 sequentially provides a subtractor 120 and a compartor 110 with a set of ith errors $E_i=(e_{i1}, \ldots, e_{iN})$ for an ith line segment $\overline{V_iV_{i+1}}$ starting from the set of first errors $E_1$. For example, referring to FIG. 2, a set of first errors for the first line segment $\overline{V_1V_2}$ can be expressed as $E_1=(e_{11}, e_{12}, e_{13}, e_{14})$ and sets of a second and a third errors expressed as $E_2=(e_{21}, e_{22}, e_{23}, e_{24})$ and $E_3=(e_{31}, e_{32}, e_{33}, e_{34})$, respectively. Therefore, as a result, the error detection block 105 generates sets of errors expressed in forms as described above.

Upon receiving the set of first errors $E_1$, the comparator 110 issues a first control signal to a compensator 115 and the data formatting circuit 180. In response to the first control signal, the compensator 115 then provides the subtractor 120 and an adder 150 with a predicted set of errors having zero valued errors $E_0$ stored in a memory (not shown) therein. The subtractor 120 subtracts a predicted set of errors received from the compensator 115 from a set of ith errors $E_i$ received from the error detection block 105. Therefore, in this case, at the subtractor 120, the set of zero valued errors $E_0$ is subtracted from the set of first errors $E_1$ and generates to a transform block 125 a set of first differential errors $E_1'=E_1-E_0$, which is exactly equal to the set of first errors $E_1$ for the first line segment $\overline{V_1V_2}$.

At the transform block 125, the set of first differential errors is transformed into a set of transform coefficients. In a preferred embodiment of the invention, a DST (discrete sine transform) is employed in transforming the set of first differential errors. It should be noted, however, any other transform technique, e.g., DCT (discrete cosine transform), can be used in lieu of the DST. The set of transform coefficients is then provided to a quantizer 130, wherein the set of transform coefficients is quantized into a set of quantized coefficients by using a conventional quantization method. The set of quantized coefficients is applied to a statistical coder 170 and to an inverse quantizer 135. The statistical coder 170 encodes the set of quantized coefficients by using, e.g., a run length coding and a variable length coding techniques, thereby providing a first encoded signal representing the first contour segment of the object to a data formatting circuit 180.

Meantime, at the inverse quantizer 135, the set of quantized coefficients from the quantizer 130 is converted back into a set of reconstructed transform coefficients which is transmitted to an inverse transform block 140, wherein an inverse transform is performed on the set of reconstructed transform coefficients, thereby generating a set of first reconstructed differential errors. And then, the set of first reconstructed differential errors is provided to the adder 150 to be added to a data received from the compensator 115. Therefore, in this case, the set of first reconstructed differential errors and the predicted set of errors having zero valued errors $E_0$ are added together to generate a set of first reconstructed errors expressed as $E_1''$ for the first line segment $\overline{V_1V_2}$ which is provided to a memory 160 and stored therein.

Thereafter, the set of second errors $E_2$ from the error detection block 105 is provided to the comparator 110 and to the subtracter 120. The comparator 110 reads from the memory 160 the set of first reconstructed errors $E_1''$ for the first line segment $\overline{V_1V_2}$ and then compares an error value for the set of second errors $E_2$ with an error value for a set of second differential errors E2' for the set of second errors E2, the $E_2'$ being defined as: $E_2'=(e_{21}-e_{11}'', e_{22}-e_{12}'', \ldots, e_{2j}-e_{1j}'', \ldots, e_{2N}-e_{1N}'')$, the $e_{1j}''$ represents a jth error of the set of first reconstructed errors for the first line segment $\overline{V_1V_2}$ and the $e_{2j}$ represents a jth error of the set of second errors for the second line segment $\overline{V_2V_3}$, wherein j=1,2,...N. The error values for the $E_2$ and $E_2'$ are mean absolute errors defined as:

$$AE_2 = \frac{1}{N} \sum_{j=1}^{N} |e_{2j}|$$

$$AE_2' = \frac{1}{N} \sum_{j=1}^{N} |e_{2j} - e_{1j}''|$$

respectively, wherein the $AE_2$ and $AE_2'$ are the mean absolute errors for the sets of second errors and second differential errors, respectively.

If the error values $AE_2$ is not greater than that of the error value $AE_2'$, the comparator 110 provides a first control signal to the compensator 115 through a line L40 and to the data formatting circuit 180 through a line L20; and if otherwise, the comparator 110 provides a second control signal to the compensator 115 and to the data formatting circuit 180. It should be noted that in lieu of the mean absolute errors, mean square errors can be used to calculate the error values. In this case, the mean square errors are defined as:

$$SE_2 = \frac{1}{N} \sum_{j=1}^{N} (e_{2j})^2$$

$$SE_2' = \frac{1}{N} \sum_{j=1}^{N} (e_{2j} - e_{ij}'')^2$$

wherein the $SE_2$ and $SE_2'$ are the mean square errors for the sets of second errors and second differential errors, respectively.

In response to the first control signal from the comparator 110, the compensator 115 provides the subtractor 120 and the adder 150 with a predicted set of errors having zero valued errors $E_0$. And after a set of ith errors is transmitted to the comparator 110 if the second control signal is supplied from the comparator 110, the compensator 115 also reads the set of (i−1)st reconstructed errors $E_{(i-1)}''$ from the memory 160 and provides same to the adder 150 as a predicted set of errors. If the second control signal is supplied from the comparator 110, the subtractor 120 subtracts a predicted set of errors exactly same to a set of reconstructed (i−1)st errors $E_{(i-1)}''=\{e_{(i-1)j}''\}$ from a set of ith errors $E_i=\{e_{ij}\}$ received from the error detection block 105, thereby generating a set of ith differential errors $E_i'=\{e_{ij}-e_{(i-1)j}''\}=(e_{i1}-e_{(i-1)1}'', e_{i2}-e_{(i-1)2}'', \ldots, e_{ij}-e_{(i-1)j}'', \ldots, e_{iN}-e_{(i-1)N}'')$ with j being a positive integer ranging from 1 to N. Therefore, after the set of second errors $E_2$ is transmitted to the comparator 110, if the second control signal is supplied from the comparator 110, the compensator 115 reads the set of first reconstructed errors for the first line segment $\overline{V_1V_2}$ from the memory 160 and provides same to the subtractor 120 and the adder 150 as a predicted set of errors for the second line segment $\overline{V_2V_3}$.

For the set of second errors, the transform block 125, the quantizer 130, the inverse quantizer 135, the inverse transform block 140, the adder 150 and the statistical coder 170 function in a same manner as described with respect to the set of first errors $E_1$, and therefore, will not be described again for the sake of simplicity. At the memory 160, the previously stored set of first reconstructed errors $E_1''$ for the first line segment $\overline{V_1V_2}$ is updated with a set of second reconstructed errors for the second line segment $\overline{V_2V_3}$. The process described above with respect to the set of second errors is repeated for the subsequent sets of errors until all the sets of errors for all the contour segments are processed.

At the data formatting circuit 180, an extra bit is appended to each of the encoded signal in response to a control signal from the comparator 110. That is, if the first control signal is provided for an encoded signal, the first control signal appended to the encoded signal is an extra bit, e.g., 0, indicating that the encoded signal is intracoded. And if the second control signal is provided for an encoded signal, the second control signal appended to the encoded signal is an extra bit, e.g., 1, representing that the encoded signal is inter-coded, i.e., a set of differential errors is calculated and encoded with respect to a previous contour segment. Thereafter, the vertex information and each of the encoded signals having extra bits appended thereto are formatted in a suitable form and applied to a transmitter (not shown) for the transmission thereof.

While the present invention has been described with reference to the particular embodiments, it will be apparent to those skilled in the art that various changes and modification may be made without departing from the spirit and scope of the invention as defined in the following claims.

What is claimed is:

1. A method for encoding a contour of an object in a video signal based on a polygonal approximation thereof, wherein the contour is divided into a plurality of contour segments including a reference contour segment and each contour segment approximated by a line segment joining two end points thereof, the method comprising the steps of:

(a) estimating a set of first approximation errors representing a difference between the reference contour segment and a first line segment, the first line segment joining two end points of the reference contour segment;

(b) obtaining a set of second approximation errors representing a difference between one of remaining contour segments and a second line segment, the second line segment being defined as a line segment joining two end points of said one of the remaining contour segments;

(c) calculating a set of differential errors by subtracting the set of first approximation errors from the set of second approximation errors;

(d) finding a first error value for the set of differential errors, the first error value being obtained based on a magnitude of said each differential error;

(e) computing a second error value for the set of second approximation errors, the second error value being obtained based on a magnitude of said each second approximation error;

(f) selecting, as a set of errors for said one of the remaining contour segments, either the set of differential errors or the set of second approximation errors based on the first and the second error values; and (g) encoding the set of errors to thereby provide an encoded set of errors.

2. The method according to claim 1, wherein said step (b) for obtaining the set of second approximation errors includes the steps of:

(b1) taking N sample points on the second line segment, N being a positive integer; and (b2) calculating the set of second approximation errors at the sample points, a second approximation error representing a displacement from a sample point to an intersection point which is formed by said one of the remaining contour segments and a line normal to the second line segment at the sample point.

3. The method according to claim 2, wherein said displacement is represented by a distance between the sample point and the intersection point and a sign denoting a relative position of the intersection point with respect to the second line segment.

4. The method according to claim 1, further comprising, after said step (g), the steps of:

(h) decoding the encoded set of errors to thereby provide a set of reconstructed errors;

(i) if the set of differential errors have been selected in said step (f), adding the set of first approximation errors to the set of reconstructed errors to provide a set of reconstructed second approximation errors and if otherwise, taking the set of reconstructed errors as a set of reconstructed second approximation errors;

(j) replacing the set of reconstructed second approximation errors and said one of the remaining contour segments with the set of first approximation errors and the reference contour segments, respectively; and (k) repeating said steps (b) to (j) for the rest of the line segments.

5. The method according to claim 4, wherein said step (a) for estimating the set of first approximation errors includes the steps of:

(a1) taking N sample points on the first line segment;

(a2) calculating a set of reference errors at the sample points, a reference error representing displacement information from a sample point to an intersection point which is formed by the reference contour segment and a line normal to the first line segment at the sample point and the displacement information being represented by a distance between the sample point and the intersection point and a sign denoting a relative position of the intersection point with respect to the first line segment;

(a3) encoding the set of reference errors to provide a set of encoded reference errors;

(a4) decoding the set of encoded reference errors to provide a set of reconstructed reference errors; and (a5) replacing the set of reconstructed reference errors with the set of first approximation errors.

6. The method according to claim 5, wherein one of the end points of the reference contour segment coincides with one of the end points of said one of the remaining contour segments.

7. The method according to claim 1, wherein said step (f) includes the steps of:

(f1) comparing the first and the second error values; and (f2) choosing, as a set of errors, the set of differential errors if the first error value is not greater than the second error value and the set of second approximation errors if otherwise.

8. The method according to claim 5, wherein said first and second error values are mean absolute errors defined as:

$$AE_2 = \frac{1}{N} \sum_{j=1}^{N} |e_{2j}|$$

$$AE_2' = \frac{1}{N} \sum_{j=1}^{N} |e_{2j} - e_{1j}''|$$

wherein the $AE_2$ and $AE_2'$ are the mean absolute errors for the sets of second approximation errors and second differential errors, respectively; and the $e_{2j}$ is a jth error in the set of second approximation errors and the $e_{1j}''$ is a jth error of the set of reconstructed reference errors.

9. The method according to claim 5, wherein said first and second error values are mean square errors defined as:

$$SE_2 = \frac{1}{N} \sum_{j=1}^{N} (e_{2j})^2$$

$$SE_2' = \frac{1}{N} \sum_{j=1}^{N} (e_{2j} - e_{1j}'')^2$$

wherein the $SE_2$ and $SE_2'$ are the mean square errors for the sets of second approximation errors and second differential errors, respectively; and the $e_{2j}$ is a jth error in the set of second approximation errors and the $e_{1j}''$ is a jth error of the set of reconstructed reference errors.

10. The method according to claim 2, wherein said N sample points are equi-distanced from each other on the second line segment.

11. The method according to claim 5, wherein said N sample points are equi-distanced from each other on the first line segment.

12. A method for encoding a contour of an object in a video signal, comprising the steps of:

(a) determining a plurality of vertex points on the contour to thereby provide vertex information representing positions of the vertex points;

(b) fitting the contour with a multiplicity of line segments, wherein the contour is divided into a corresponding number of contour segments, said contour segment being formed by two adjacent vertex points along the contour and approximated by a line segment joining said two vertex points;

(c) indexing the line segments;

(d) taking N sample points with N being a positive integer on a first line segment and calculating errors at the sample points to thereby generate a set of first errors, wherein an error represents a displacement from a sample point to an intersection point which is formed by a contour segment corresponding to the first line segment and a line vertical to the first line segment at the sample point;

(e) encoding the set of first errors to provide an encoded set of errors;

(f) decoding the encoded set of errors to generate a decoded set of errors;

(g) subjecting a next line segment in stead of the first line segment to said step (d) to generate a next set of errors;

(h) subtracting the decoded set of errors from the next set of errors, thereby obtaining a set of differential errors;

(i) comparing an error value of the next set of errors with an error value of the set of differential errors, wherein an error value of each set is obtained by using magnitude of each error in said each set;

(j) generating a set of zero valued errors as a predicted set of errors if the error value for the next set of errors is not greater than that for the set of differential errors and generating the set of differential errors as the predicted set of errors if otherwise; and (k) subtracting the predicted set of errors from the next set of errors to provide a set of differential errors.

13. The method according to claim 12, further comprising, after said step (k), the steps of:

(l) repeating said steps (e) and (f) with respect to the set of differential errors generated from said step (k) in stead of the set of first errors;

(m) adding the decoded set of errors generated in said step (l) to the predicted set of errors generated from said step (j) to thereby provide a set of reconstructed errors;

(n) repeating said step (g);

(o) subtracting the set of reconstructed errors from the next set of errors generated in said step (n), thereby obtaining a set of differential errors;

(p) repeating said steps (i) to (m) with respect to the next set of errors and the set of differential errors generated in said steps (n) and (o), respectively; and (q) repeating said steps (n) to (p) for the remaining line segments.

14. The method according to claim 12, wherein the displacement in said step (d) is represented by a distance between the sample point and the intersection point and a sign denoting a relative position of the intersection point with respect to the first line segment.

15. The method according to claim 12, wherein said error values are mean absolute errors defined as:

$$AE_2 = \frac{1}{N} \sum_{j=1}^{N} |e_{2j}|$$

$$AE_2' = \frac{1}{N} \sum_{j=1}^{N} |e_{2j} - e_{1j}''|$$

wherein the $AE_2$ and $AE_2'$ are the mean absolute errors for the next set of errors and the set of differential errors, respectively; and the $e_{2j}$ is a jth error in the next set of errors and the $e_1''$ is a jth error of the decoded set of errors.

16. The method according to claim 12, wherein said error values are mean square errors defined as:

$$SE_2 = \frac{1}{N} \sum_{j=1}^{N} (e_{2j})^2$$

$$SE_2' = \frac{1}{N} \sum_{j=1}^{N} (e_{2j} - e_{1j}'')^2$$

wherein the $SE_2$ and $SE_2'$ are the mean square errors for the next set of errors and the set of set of differential errors, respectively; and the $e_{2j}$ is a jth error in the next set of errors and the $e_{ij}''$ is a jth error of the decoded set of errors.

* * * * *